United States Patent [19]

Schütz et al.

[11] Patent Number: 4,509,364

[45] Date of Patent: Apr. 9, 1985

[54] WEAR MEASURING ARRANGEMENT FOR BEARINGS

[75] Inventors: Karl H. Schütz, Schweinfurt, Fed. Rep. of Germany; Günter Mauch, Vienna, Austria

[73] Assignee: SKF Kugellagerfabriken GmbH, Schweinfurt, Fed. Rep. of Germany

[21] Appl. No.: 638,537

[22] Filed: Aug. 7, 1984

Related U.S. Application Data

[63] Continuation of Ser. No. 485,284, Apr. 15, 1983, abandoned.

[30] Foreign Application Priority Data

Apr. 16, 1982 [DE] Fed. Rep. of Germany ... 8210726[U]

[51] Int. Cl.³ ............................................ G01M 13/04
[52] U.S. Cl. ...................................... 73/118; 33/169 R
[58] Field of Search .................... 73/7, 118; 33/169 R, 33/169 B, 173; 340/682

[56] References Cited

U.S. PATENT DOCUMENTS 4,092,053  5/1978  Riegler et al. ............... 340/682 X

FOREIGN PATENT DOCUMENTS 783563  11/1980  U.S.S.R. ........................ 33/169 R

Primary Examiner—Jerry W. Myracle
Attorney, Agent, or Firm—Daniel M. Rosen

[57] ABSTRACT

In a wear measuring arrangement for bearings, a support sleeve is slidably mounted in one of the bearing rings, and supports an inductive sensor having a plunger type armature with a probe tip. The support sleeve is mounted to be held in a position with the probe tip away from the other bearing part, and to be released by a control shaft. Upon release, a spring arranged in the bore of the support sleeve resiliently urges the probe tip to engage the other bearing part and pierce any grease layer on the surface thereof.

11 Claims, 3 Drawing Figures

WEAR MEASURING ARRANGEMENT FOR BEARINGS

This application is a continuation of application Ser. No. 485,284, filed Apr. 15, 1983, now abandoned.

This invention relates to a wear measuring arrangement for bearings, particularly large rod end bearings for steel converters, in which a probe tip engages a sliding surface of a bearing part in a measuring position, and is lifted from the sliding surface after measurement by an adjusting arrangement connected to the sensing probe.

A wear measuring arrangement of the above type is known. The known measuring arrangement consists of a proportionally large housing, in which a sensing probe is slidably guided, and is positioned against a shaft by air pressure. This arrangement has a large overall height, and requires a special air pressure supply and a special control element.

It is also known to provide a contactless sensor, in the overlying parts of a bearing housing, which serves to provide a continuous measurement of bearing changes of the bearing pin upon wear of the sliding layer. This known wear measuring arrangement has the disadvantage that fault measurements can arise as a result of the grease layer or the like formed on the sliding surface.

It is therefore the object of this invention to provide a wear measuring arrangement of the above type which only requires a minimum volume and can be arranged in a bore of a bearing part.

It is a further object to provide a wear measuring arrangement wherein the probe tip is so urges against the measuring surface that a grease layer or the like on the bearing part is pierced and the accuracy of the measurement is not adversely affected by the grease layer.

These objects are achieved in accordance with the invention by providing a slidable support housing with a preferably inductive sensor inserted either in a bore on the bearing part or in the bore of a sleeve connected to the bearing part.

The wear measuring arrangement in accordance with the invention provides a high measuring accuracy, so that the degree of wear of the sliding material may be determined at any time.

According to an advantageous further embodiment of the invention, the armature of the inductive sensor is connected to a guide shell arranged in the bore of the support sleeve. A spring abuts the sides of the guide shell facing away from the surface to be measured in the upper position of the support sleeve the other side of the guide shell engaging a spring ring or the like arranged in the bore of the support sleeve, with prestress. As a result the plunging-type armature is firmly guided for a larger measuring displacement and the probe tip is resiliently forced against the sliding surface before the support sleeve has reached a lower position.

In order that the invention will be more clearly understood, it will now be disclosed in greater detail with reference to the accompanying drawings, wherein.

Figure 1:
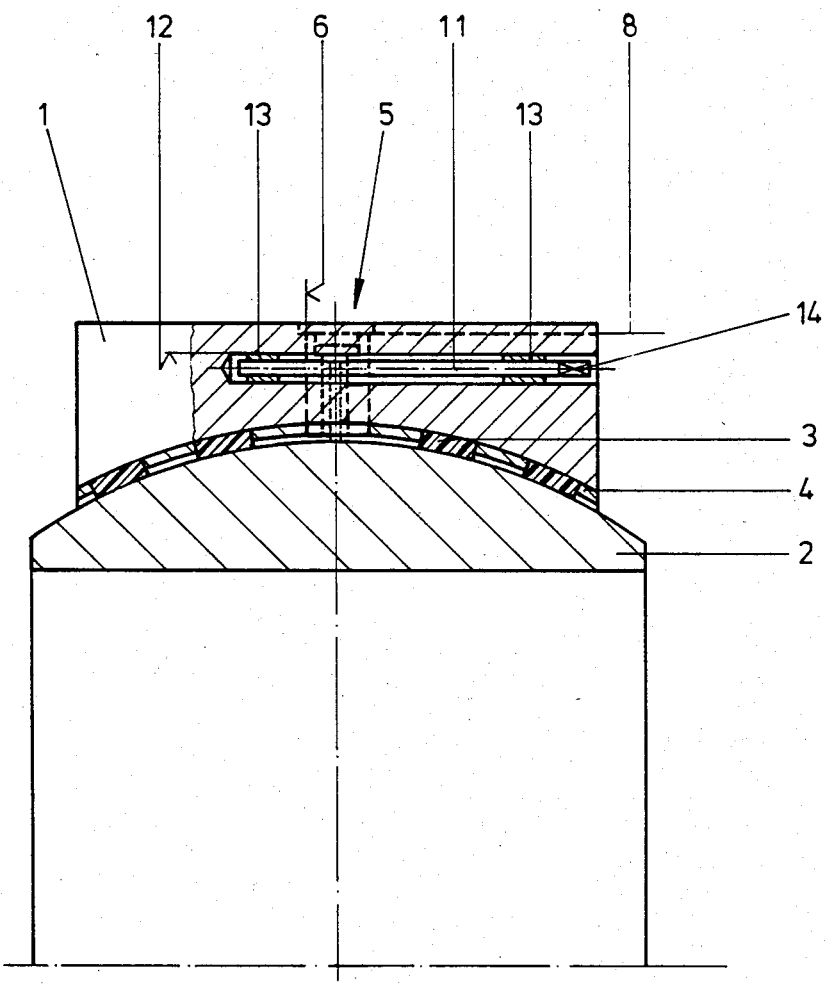
FIG. 1 is a cross-sectional view of a portion of a large rod end bearing having the wear measuring arrangement of the invention.
Figure 2:
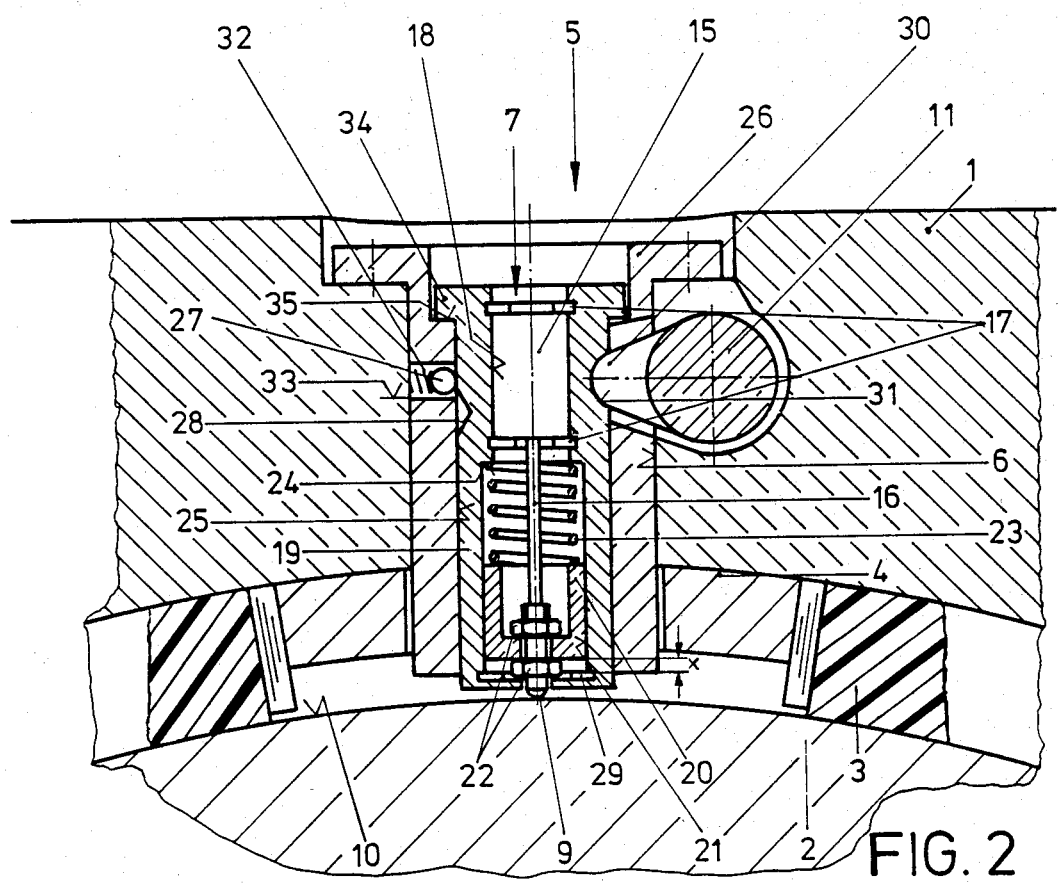
FIG. 2 is an enlarged cross-sectional view of the wear measuring arrangement of FIG. 1.
Figure 3:
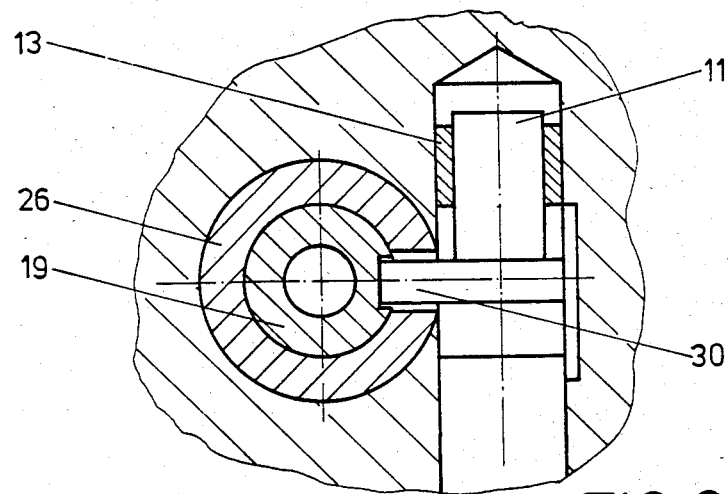
FIG. 3 is a cross-sectional view of a portion of the wear measuring arrangement of FIG. 2 illustrated in the region of the cam provided on the control shaft.

FIG. 1 illustrates a large rod end bearing having an outer ring 1, an inner ring 2, and sliding elements 3 between the bearing rings, the sliding elements 3 being arranged with a cage 4 connected to the outer ring 1. The wear measuring arrangement 5 illustrated in FIGS. 2 and 3 is located in a radially extending bore 6 of the outer ring 1, and consists of an inductive sensor 7 which measures radial displacement of the inner bearing ring 2 with respect to the outer bearing ring 1. The measurement value can be read from an indicator (not shown) located outside of the bearing and connected to the sensor 7 by a cable 8. In order to ensure that the probe tip 9 of the inductive sensor 7 does not constantly rub against the sliding or measuring surface 10 of the inner ring in operation, it is raised by a control shaft 11 which is guided in a bearing 13 provided in an axially extending bore 12 of the outer ring 1. The control shaft 11 is provided with a square end 14 so that it can be operated externally during operation, so that the probe tip 9 can be brought at any time to the measuring position.

The inductive sensor 7 illustrated in enlarged view in FIG. 2 has a coil 15 and a plunger-type armature 16 and is held in the bore 18 of a support sleeve 19 by spring rings 17. A guide shell 20 having a U shaped cross-section is moveably positioned in the bore 21 of the support sleeve 19 and is connected to the armature 16 by nuts 22, which are threaded on the armature and engage opposite sides of the guide shell. A helical spring 23 abuts the free end of the guide shell 20, the other end of the spring 23 being supported on a shoulder 24 of the support sleeve 19. The support sleeve 19 is slidably positioned in the bore 25 of a sleeve 26 connected to the outer ring 1. The maximum measurement range of the inductive sensor 7 can be adjusted by turning the nuts 22.

When measurements are not being taken, the support sleeve 19 is held in its upper position by means of a ball 27 which engages a recess 28 in the outer surface of the support shell 19. At the same time the guide sleeve 20 abuts the spring ring 29 in the lower end of the support body 19, under the pressure of the compressed spring 23. In this position the probe tip 9 does not contact the sliding surface 10 of the inner ring 2. In order to measure the wear, the support sleeve 19 is released from the withdrawn position by means of a cam 30 on the control shaft 11, which engages a recess 31 of the support sleeve 19, so that the ball 27 is urged into its bore 33 in the sleeve 26, against the pressure of the spring 32. The support sleeve 19 has an upper flange 34 adapted to engage a shoulder 35 in the inner bore of the outer sleeve 26 in its lower position, so that the probe tip 9 of the plunging armature 16 is pressed rigidly against the sliding surface 10 of the inner ring 2. At the same time the guide shell 29 is lifted about a distance X from the facing surface of the spring ring 29. Each radial displacement of the inner ring 2 results in a corresponding change in the distance X, which can then be derived from the indicating apparatus and is a measure of the bearing wear. Since the probe tip 9 of the plunging armature 16 is pressed against the sliding surface 10 by the spring 23, it will eventually pierce the hardened grease layer or the like formed on the sliding surface 10 so that the accuracy of the wear measurement is not adversely affected.

The above-described arrangement constitutes only one embodiment of the invention. It is apparent that changes may be made within the scope of the invention. For example, the support sleeve may be provided with a toothed profile on one side, engaged by a pinion on the control shaft. In addition, the wear measuring arrangement in accordance with the invention can be employed for thrust bearings, as well as the disclosed arrangement for measuring wear of radial bearings.

What is claimed is:

1. A wear measuring apparatus for measuring wear on a sliding surface of a first bearing part, comprising a support sleeve slidably arranged in a second bearing part for movement between upper and lower positions, away from and toward said sliding surface, and a sensor assembly, said sensor assembly including a sensor, a plunger-type armature, a probe tip connected to said armature, and a spring, said spring being mounted with respect to said support sleeve and said plunger-type armature so as to urge said plunger-type armature in the direction of said sliding surface.

2. The apparatus of claim 1, wherein said sensor is inductive.

3. The wear measuring device of claim 1, wherein said support sleeve and sensor assembly are mounted in a bore formed in said second bearing part, and further comprising means for moving said support sleeve between said upper and lower positions.

4. The wear measuring device of claim 3, wherein said means for moving is a mechanical link coupling a control shaft to engage a recess in the outer surface of said support sleeve.

5. The wear measuring device of claim 3, wherein said support sleeve has a flange engaging a shoulder formed in said second bearing part when said support sleeve is in said lower position.

6. The wear measuring device of claim 1, wherein said support sleeve is held in said upper position by a spring loaded ball, said ball engaging a recess in the outer surface of said support sleeve.

7. The wear measuring device of claim 1, wherein said sensor is inductive and includes a coil positioned in a first bore formed in said support sleeve, said coil being coupled to a guide shell, arranged in a second bore formed in said support sleeve, by said plunger-type armature.

8. The wear measuring device of claim 7, wherein said guide shell has a U-shaped cross-section, abuts said spring at its open end, and is rigidly fixed with respect to said armature, said spring imparting contact resistance to said probe tip.

9. The wear measuring device of claim 1, further comprising a guide shell slidably arranged in said support sleeve, wherein said guide shell within said support sleeve engages spring means with prestress when said support sleeve is in the upper position.

10. A wear measuring apparatus for measuring wear on a sliding surface of a first bearing part, comprising an outer sleeve arranged in a bore formed in a second bearing part, a support sleeve slidably arranged in said outer sleeve for movement between upper and lower positions, away from and toward said sliding surface, and a sensor assembly, said sensor assembly including a sensor, a plunger-type armature, a probe tip connected to said armature, and a spring, said spring being mounted with respect to said support sleeve and said plunger-type armature so as to urge said plunger-type armature in the direction of said sliding surface.

11. The wear measuring apparatus of claim 10, wherein said support sleeve has a flange engaging a shoulder formed in said outer sleeve when said support sleeve is in said lower position, and said outer sleeve has a flange engaging a shoulder formed in said second bearing part.

* * * * *